United States Patent
Gao et al.

(10) Patent No.: US 10,131,032 B2
(45) Date of Patent: Nov. 20, 2018

(54) RAPID-REPLACING STRUCTURE OF MULTIFUNCTIONAL SAW

(71) Applicant: ZHEJIANG JINMEI ELECTRIC TOOLS CO., LTD., Jinhua, Zhejian Province (CN)

(72) Inventors: Jinyun Gao, Jinhua (CN); Zhiming Feng, Jinhua (CN)

(73) Assignee: ZHEJIANG JINMEI ELECTRIC TOOLS CO., LTD., Jinhua (CN)

( * ) Notice: Subject to any disclaimer, the term of this patent is extended or adjusted under 35 U.S.C. 154(b) by 4 days.

(21) Appl. No.: 15/416,842

(22) Filed: Jan. 26, 2017

(65) Prior Publication Data

US 2017/0291277 A1 Oct. 12, 2017

(30) Foreign Application Priority Data

Apr. 11, 2016 (CN) .......................... 2016 1 0221396
Sep. 26, 2016 (CN) ..................... 2016 2 1078900 U

(51) Int. Cl.
*B24B 45/00* (2006.01)
*B23B 31/10* (2006.01)
(Continued)

(52) U.S. Cl.
CPC .......... *B24B 45/006* (2013.01); *B23D 61/006* (2013.01); *B24B 23/04* (2013.01);
(Continued)

(58) Field of Classification Search
CPC ....... B23B 31/10; B23B 31/19; B27B 19/006; B27B 5/30; B27B 5/32; B24B 23/02;
(Continued)

(56) References Cited

U.S. PATENT DOCUMENTS

2013/0270780 A1* 10/2013 Erni .......................... B23Q 3/12
                                                              279/141
2014/0183828 A1*  7/2014 Xu ......................... B27B 19/006
                                                              279/141
2017/0259348 A1*  9/2017 Scott ....................... B23B 31/19

FOREIGN PATENT DOCUMENTS

DE    102005047402 A1 *  4/2007  .......... B24B 23/022
DE    102012007924 A1 * 10/2013  .......... B27B 19/006
EP       0962283 A1 * 12/1999  ............. B24B 23/04

OTHER PUBLICATIONS

Machine translation, EPO patent document, EP 0962283, Wurst, B., Apr. 14, 1999.*

(Continued)

*Primary Examiner* — Eric A Gates
*Assistant Examiner* — Chwen-Wei Su
(74) *Attorney, Agent, or Firm* — Jiwen Chen

(57) ABSTRACT

The present invention relates to a rapid-replacing structure of multifunctional saw, including a head housing, a tool rest and an output device, wherein the output device comprises an output shaft. It also includes a quick-change device that consists of a rapid-replacing buckle, an eccentric block, a movable rod, a collet chuck, a tensioning rod and a compression spring. The rapid-replacing buckle and the eccentric block are connected with the top of the head housing through a straight pin. The movable rod is arranged in the output shaft, with its top end closely connected to the eccentric block and its bottom end connected to the tensioning rod by screw thread. The rapid-replacing structure of the multifunctional saw can realize the purpose of blade removal and replacement simply by shifting the rapid-replacing buckle on the upper side of the head housing, without using other auxiliary means, so it is simple and fast to operate.

9 Claims, 7 Drawing Sheets

(51) Int. Cl.
    *B23B 31/19*     (2006.01)
    *B27B 19/00*     (2006.01)
    *B27B 5/32*      (2006.01)
    *B23D 61/00*     (2006.01)
    *B24B 23/04*     (2006.01)

(52) U.S. Cl.
    CPC .............. *B27B 5/32* (2013.01); *B27B 19/006* (2013.01); *B23B 31/10* (2013.01); *B23B 31/19* (2013.01); *Y10T 279/33* (2015.01)

(58) Field of Classification Search
    CPC ..... B24B 23/04; B24B 45/006; B23D 61/006; Y10T 279/33
    See application file for complete search history.

(56) References Cited

OTHER PUBLICATIONS

Machine translation, German Patent Document, DE 102005047402, Stimpel, J., Oct. 4, 2005.*

* cited by examiner

RAPID-REPLACING STRUCTURE OF MULTIFUNCTIONAL SAW

The present application claims the priority of Chinese Patent Application No. 201610221396.1 filed Apr. 11, 2016 and Chinese Patent Application No. 201621078900.9, filed Sep. 26, 2016, under 35 U.S.C. § 119, which are all hereby incorporated by reference.

TECHNICAL FIELD

The present invention belongs to the technical field of mechanical equipment and relates to a detachable structure for rapid separation or reassembly of the work head and machine body of a head-replaceable electric tool, in particular to a rapid-replacing structure of a multifunctional saw. The present invention further discloses the rapid-replacing method of the rapid-replacing structure of the multifunctional saw.

BACKGROUND TECHNOLOGY

Multifunctional saws can clamp woodworking saw blades, metal saw blades, triangular sand discs, etc. When clamping woodworking saw blades or metal saw blades, the saws can cut and process wood boards, aluminum alloy materials and other metal materials. When clamping triangular sand discs attached with sandpaper, the saws can conduct sanding and polishing on wood boards, plasterboards or wall surfaces.

The vast majority of multifunctional saws adopt pressing plates and hexagon socket head cap screws, and such saws need special tools for fastening or unscrewing when replacing saw blades. The structure and change mode of this type of multifunctional saws face troubles in operation, like failure in fastening or demounting. Moreover, such saws need a supporting carry-on hexagon wrench that may be lost easily. Furthermore, without a locking safety structure, the saws have potential safety hazards, which may cause personal injury.

SUMMARY OF THE INVENTION

To overcome the abovementioned defects, expand application scope and improve the product experience, the present invention provides a rapid-replacing structure of multifunctional saw, which not only realizes quick change of blades but also ensures personal safety in the process of replacing.

To realize the purpose, the technical scheme provided by the present invention is as follows.

The present invention relates to a rapid-replacing structure of a multifunctional saw, comprising a head housing, a tool rest and an output device, wherein the output device comprises an output shaft. It also comprises a rapid-replacing device, which includes a rapid-replacing buckle, an eccentric block, a movable rod, a spring collet, a tensioning rod and a compression spring. The rapid-replacing buckle and the eccentric block are connected with the top of the head housing through a straight pin. The movable rod is arranged in the output shaft, with its top end closely connected to the eccentric block and its bottom end connected to the tensioning rod by screw thread. The outer side of the tensioning rod is provided with the spring collet, and the outer side of the spring collet is provided with the compression spring. The top end of the compression spring is in close connection with the lower surface of the movable rod, and its bottom end is in close connection with the upper surface of the tool rest. The tool rest is arranged at the bottom of the output shaft; a slope shrinking inwards from top to bottom is arranged on the inner wall of the tool rest, and a bump corresponding to the slope is arranged on the outer surface of the spring collet. There is a certain space between the top end of the spring collet and the lower surface of the movable rod. In addition, the bottom end of the tensioning rod is provided with a tensioning head.

Preferably, the output device is arranged in the head housing, comprising a shifting fork, an output shaft, a deep groove ball bearing and a needle bearing. The deep groove ball bearing is fixed on the outer side of the top of the output shaft through snap springs, and the shifting fork is arranged on the outer side of the middle portion of output shaft. The needle bearing is arranged on the outer side of the bottom of output shaft.

Preferably, the output shaft is of a hollow cylinder structure divided into upper, middle and lower sections. The diameter of the upper section of the output shaft is smaller than that of the middle section, and the middle diameter of the output shaft is smaller than that of the lower section. A mounting slot of snap springs is arranged on the outer wall of the upper section of the output shaft.

Preferably, the snap springs are arranged at the upper and lower end of the deep groove ball bearing respectively. The deep groove ball bearing is connected with the output shaft through the snap spring at the upper end, and with the head housing through the snap spring at the lower end.

Preferably, a seal ring is arranged in the gap between the head housing on the lower side of the needle bearing and the output shaft.

Preferably, the rapid-replacing structure of the multifunctional saw also comprises a return limit mechanism that comprises a limit block, a straight pin and a torsion spring. The rapid-replacing buckle is hinged to the top side of the head housing. The upper portion of the head housing is provided with a limit slot, and the whole rapid-replacing buckle is positioned above the limit slot. The limit block is hinged in the limit slot through the straight pin, and the torsion spring is sheathed on the outer ring of the straight pin. One end of the torsion spring acts on the limit slot, and its other end acts on the limit block. A reset handle is arranged at one end of the limit block far away from the straight pin.

The torsion spring of the present invention is used for rotating the limit block to the designated position of the head housing.

Preferably, 3-5 pieces of magnetic steel are arranged at the bottom of the tool rest. The magnetic steel is uniformly distributed on the bottom surface of the tool rest in the circumferential direction with the axis of the tool rest as the center.

Preferably, the limit block and the reset handle are of an integrated structure, and a handle-placing slot corresponding to the reset handle is arranged on the limit slot.

Preferably, two mounting holes of the straight pin corresponding to each other are arranged in one end where the limit block is connected with the straight pin and on two sides of the limit slot respectively.

Compared with the prior art, the technical scheme provided by the present invention has the following beneficial effects.

The rapid-replacing structure of the multifunctional saw can realize the purpose of blade removal and replacement simply by shifting the rapid-replacing buckle on the upper side of the head housing, without using other auxiliary means, so it is simple and fast to operate. When the rapid-replacing buckle returns, the return limit mechanism can prevent the rapid-replacing buckle from returning to the original position instantly, thus protecting personal safety of users.

Figure 1:
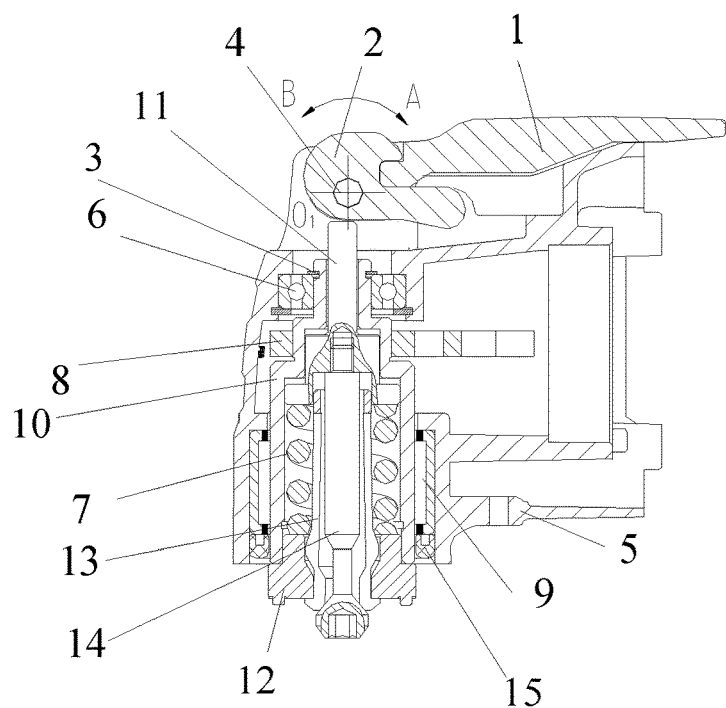
FIG. 1 is a schematic diagram of the rapid-replacing structure of multifunctional saw according to embodiment 1.

Notes to annotations of the schematic diagrams: 1-rapid-replacing buckle; 2-eccentric block; 3-snap springs; 4-straight pin; 5-head housing; 6-deep groove ball bearing; 7-compression spring; 8-shifting fork; 9-needle bearing; 10-output shaft; 11-movable rod; 12-tool rest; 13-spring collet; 14-tensioning rod; 15-seal ring; 16-saw blade; 18-mounting slot of snap springs; 19-tensioning head; 20-limit block; 21-straight pin; 22-torsion spring; 23-magnetic steel; 24-limit slot; 25-reset handle; 26-protection zone.

DESCRIPTION OF THE PREFERRED EMBODIMENTS

To further understand the content of the present invention, embodiments of the present invention will be described in reference to the accompanying drawings. The following embodiments described are used merely to illustrate the present invention but not to limit its scope.

Embodiment 1

With reference to FIG. 1-FIG. 5, a rapid-replacing structure of multifunctional saw comprises a head housing 5, a tool rest 12, an output device and a rapid-replacing device. The output device comprises a shifting fork 8, an output shaft 10, a deep groove ball bearing 6 and a needle bearing 9. The output shaft 10 is of a hollow cylinder structure divided into upper, middle and lower sections. The diameter of the upper section of the output shaft 10 is smaller than that of the middle section, and the middle diameter of the output shaft 10 is smaller than that of the lower section. A mounting slot 18 of the snap springs is arranged in the outer wall of the upper section of the output shaft 10. The rapid-replacing device comprises a rapid-replacing buckle 1, an eccentric block 2, a movable rod 11, a spring collet 13, a tensioning rod 14 and a compression spring 7.

The top of the head housing 5 is connected with the rapid-replacing buckle 1 and the eccentric block 2 through the straight pin 4, and the deep groove ball bearing 6, the shifting fork 8 and the needle bearing 9 are arranged in a cavity on the inner side of the head housing 5 from top to bottom. The deep groove ball bearing 6 is connected with the inner wall of the head housing 5 through the snap springs 3, and the upper middle and lower sections of the output shaft 10 are connected with the inner sides of the deep groove ball bearing 6, the shifting fork 8 and the needle bearing 9 respectively. The mounting slot 18 of the snap springs is arranged on the upper section of the output shaft 10, and the output shaft 10 is connected with the deep groove ball bearing 6 through the snap springs installed in the mounting slot 18. The internal diameter of the deep groove ball bearing 6 and the needle bearing 9 is 0.1-0.3 mm bigger than the external diameter of the upper section and the lower section of the output shaft respectively, so the bearings have the effect of positioning. The shifting fork 8 has the function of adjusting the rotating speed of the output shaft 10. An annular seal ring 15 is arranged in the gap between the head housing on the lower side of the needle bearing 9 and the output shaft 10.

The output shaft 10 is of a hollow structure. The movable rod 11 is arranged at the hollow position at the upper end of the output shaft 10, a round hole is arranged in the lower end of the movable rod 11, and inner threads are arranged in the hole. Outer threads are arranged at the top end of the tensioning rod 14 and are right matched with the inner threads in the hole arranged in the lower end of the movable rod 11, so the movable rod is in threaded connection with the tensioning rod 14. The spring collet 13 and the compression spring 7 sleeve on the outer side of the movable rod in sequence, the tool rest 12 is fixed at the bottom of the output shaft 10, the top end of the compression spring 7 butts against the lower surface of the movable rod, and the bottom of the compression spring 7 supports on the upper surface of the tool rest 12. A lump is arranged on the outer side of the spring collet 13, and a slope shrinking inwards from top to bottom is arranged on the inner side of the tool rest 12 corresponding to the spring collet 13. When the spring collet 13 touches the slope on the inner side of the tool rest 12 when moving downwards, the spring collet 13 can shrink. A certain space T is reserved between the top end of the spring collet 13 and the lower surface of the movable rod. A tensioning head 19 is arranged at the bottom end of the tensioning rod 14.

The working principle of the rapid-replacing structure of the multifunctional saw is as follows.

Figure 2:
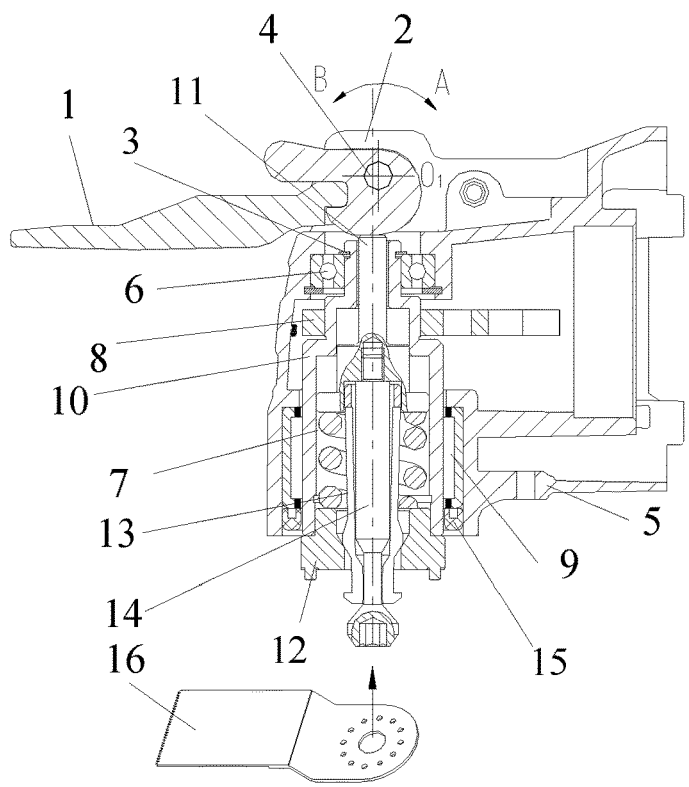
FIG. 2 is a schematic diagram of the rapid-replacing structure of multifunctional saw before use according to embodiment 1.
Figure 3:
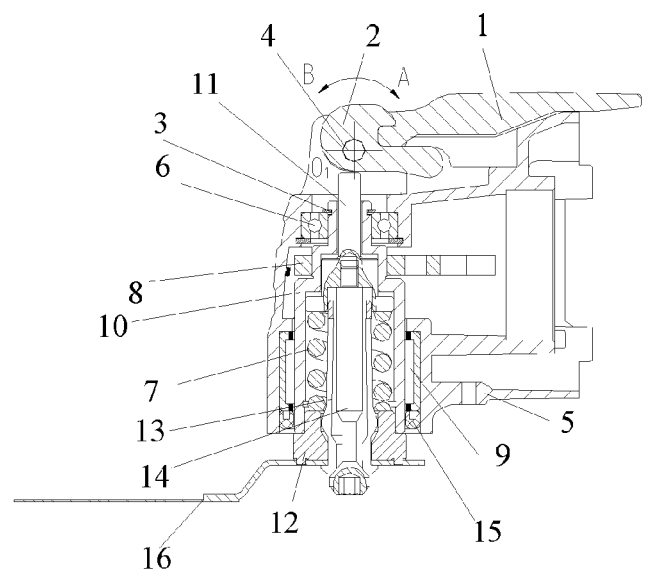
FIG. 3 is a schematic diagram of the rapid-replacing structure of multifunctional saw in use according to embodiment 1.
Figure 4:
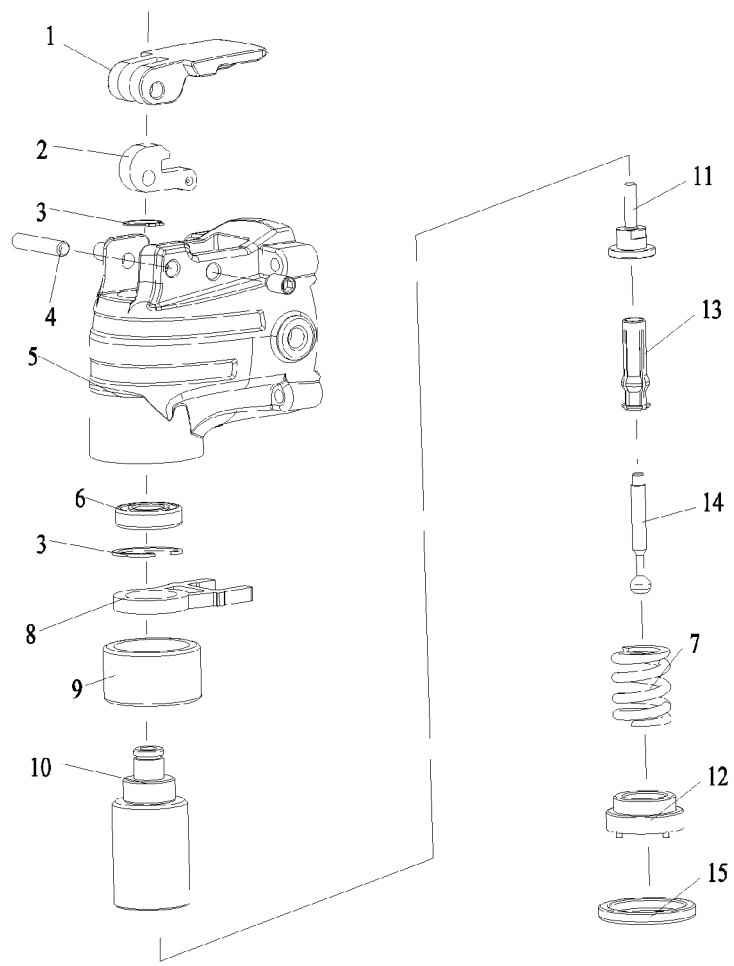
FIG. 4 is a decomposition diagram of the rapid-replacing structure of multifunctional saw according to embodiment 1.
Figure 5:
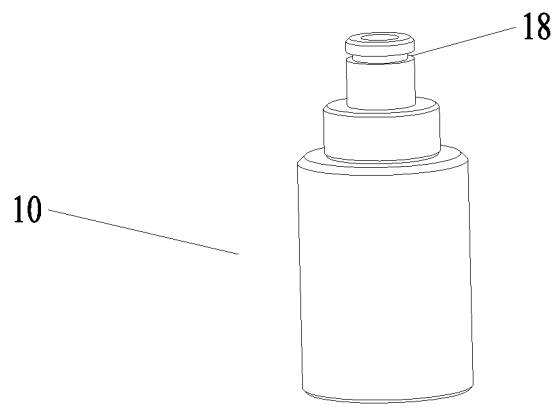
FIG. 5 is a schematic diagram of the output shaft.
Figure 6:
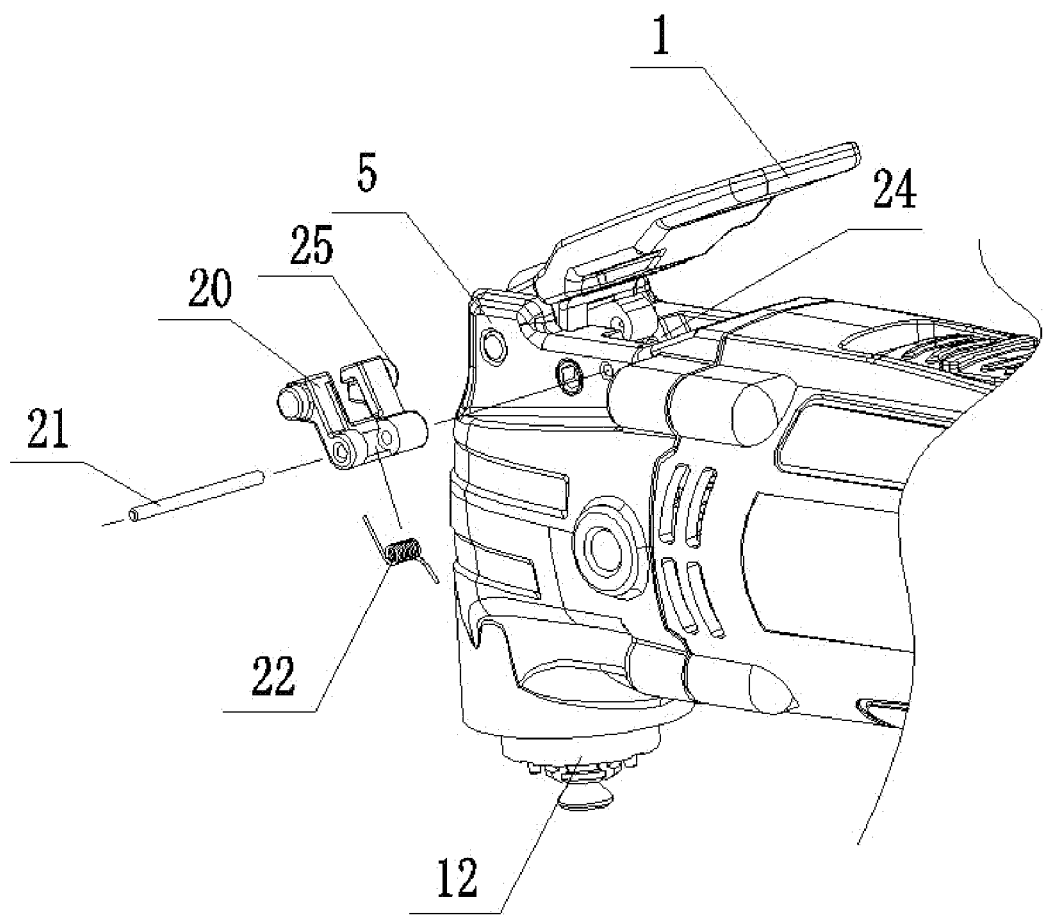
FIG. 6 is a decomposition diagram of a return limit mechanism according to embodiment 2.

Step 1: with reference to FIG. 1, the rapid-replacing buckle 1 is driven with the straight pin 21 as the center of rotation, so the rapid-replacing buckle 1 can drive the eccentric block 2 to rotate;

Step 2: with reference to FIG. 2, as the eccentric distance offsets the elastic force of the compression spring 7, the eccentric block 2 presses the movable rod 11 downwards to drive the tensioning rod 14 to move downwards for the distance T, the top end of the spring collet 13 contacts with the lower surface of the movable rod 11, then the movable rod 11 continues to move downwards to drive the spring collet 13 to move downwards, the lump at the bottom end of the spring collet 13 touches the slope on the inner wall of the tool rests, and the diameter of the lower end of the spring collet 13 shrinks under the effect of pressing;

Step 3: with reference to FIG. 2, when the diameter of the lower end of the spring collet 13 is smaller than that of the mounting hole of a blade 16, the blade 16 is arranged at the end of the spring collet;

Step 4: with reference to FIG. 3, the rapid-replacing buckle 1 is driven backwards, the movable rod 11 drives the tensioning rod 14 to move upwards under the effect of the compression spring 7, the tensioning head 19 of the tensioning rod 14 drives the spring collet 13 to move upwards, the end of the spring collet 13 stretches after losing pressure from the slope on the inner wall of the tool rest 12, and then the blade is fixed on the tool rest, so a quick change of the blade 16 can be realized.

Embodiment 2

With reference to FIG. 6-FIG. 13, a rapid-replacing structure of a multifunctional saw comprises a head housing 5, a tool rest 12, an output device, a rapid-replacing device and a return limit mechanism. The structure of the output device and the rapid-replacing device can be referred to the embodiment 1.

The return limit mechanism comprises a limit block 20, a straight pin 21 and a torsion spring 22. A rapid-replacing buckle 1 is hinged to one side of side of the top of the head housing 5, a limit slot 24 is formed in the upper portion of the head housing 5, and the whole rapid-replacing buckle 1 is located above the limit slot 24. A limit block 20 is hinged in the limit slot 24 through the straight pin 21, and the torsion spring 22 sleeves on an outer ring of the straight pin 2. One end of the torsion spring 22 acts on the limit slot 24, and the other end of the torsion spring 22 acts on the limit block 20. Two mounting holes of the straight pin for installing the straight pin 21 are formed in two sides of the limit slot 24 at the top of the head housing, and a through mounting hole of the straight pin is also formed in one end of the limit block 20 corresponding to the limit block 24. During installation of the limit block, the torsion spring 22 sleeves on the outer side of the straight pin 21, then the straight pin 21 penetrates through the mounting holes of the straight pin on two sides of the limit slot and in the limit block 20 in sequence, the limit block 20 is hinged into the limit slot, and two extension sections of the torsion spring 22 are fixed on the lower surface of the limit block 20 and the bottom surface of the limit slot 24. The limit block 20 can stretch automatically under the effect of the torsion spring 22 without limitation. As the rapid-replacing buckle 1 cannot return to the original position unless a user initiatively withdraw protection in the return process of the rapid-replacing buckle 1, a reset handle 25 is arranged at one end of the limit block 20 of the embodiment far away from a rotating shaft, and is integrated with the limit block 20. A handle placing slot (not marked in the figure) is formed in the limit slot 24, and the reset handle 25 is located in the handle placing slot when the limit block 20 is in the reset state. When the limit block 20 is in the limit state, one end of the limit block 20 far away from the straight pin is higher than the top surface of the head housing 5, and the lower surface of the reset handle 25 is clamped on two sides of the limit slot 24; when the rapid-replacing buckle 1 returns, the reset handle 25 is matched with the limit block 20, so a protection zone 26 is formed between the rapid-replacing buckle 1 and the head housing 5.

Figure 7:
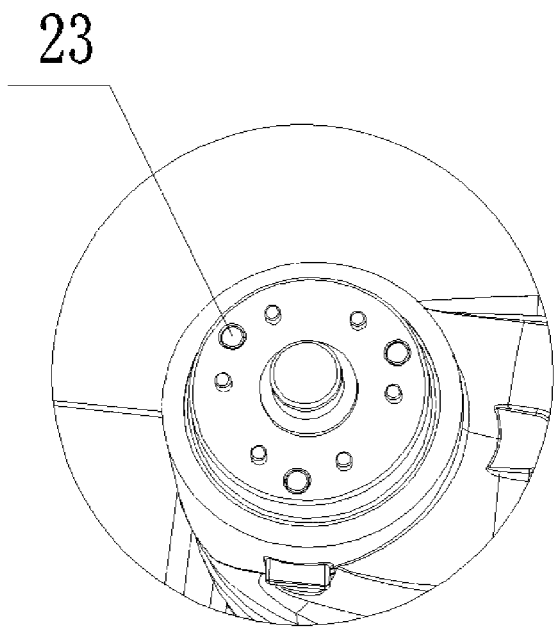
FIG. 7 is a schematic diagram of the bottom surface of tool rest according to embodiment 2.

With reference to FIG. 7, as the user needs to manually withdraw protection during the protection withdrawal process, three pieces of magnetic steel 23 are additionally arranged on the bottom surface of the tool rest 12 and are distributed on the bottom surface of the tool rest 12 uniformly in the circumferential direction with the axis of the tool rest as the center of a circle. The magnetic steel 23 is used for attracting the blade 16 temporarily so that holding of the blade by hands can be reduced and the user can better operate the rapid-replacing structure with the free hands.

Figure 8:
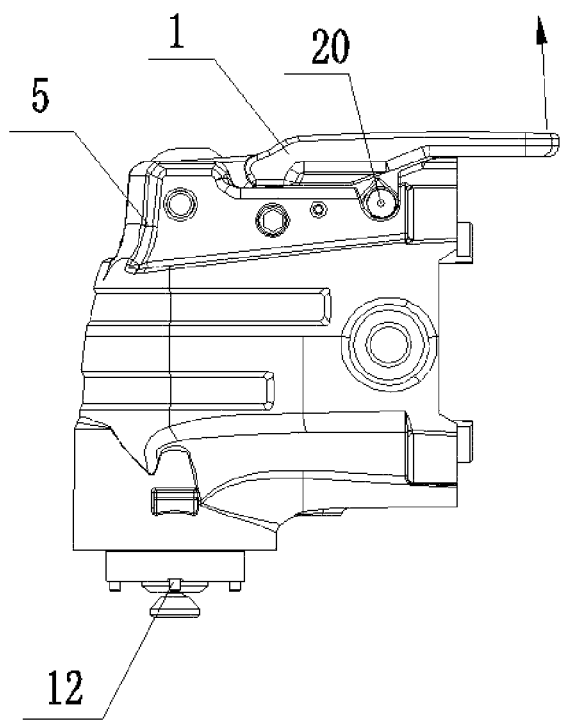
FIG. 8 is a schematic diagram of step 1 of embodiment 2.
Figure 9:
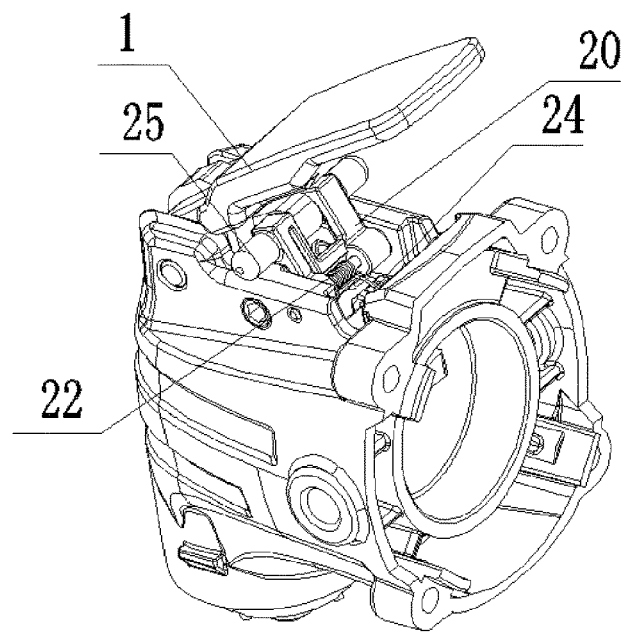
FIG. 9 is a schematic diagram of step 2 of embodiment 2.
Figure 10:
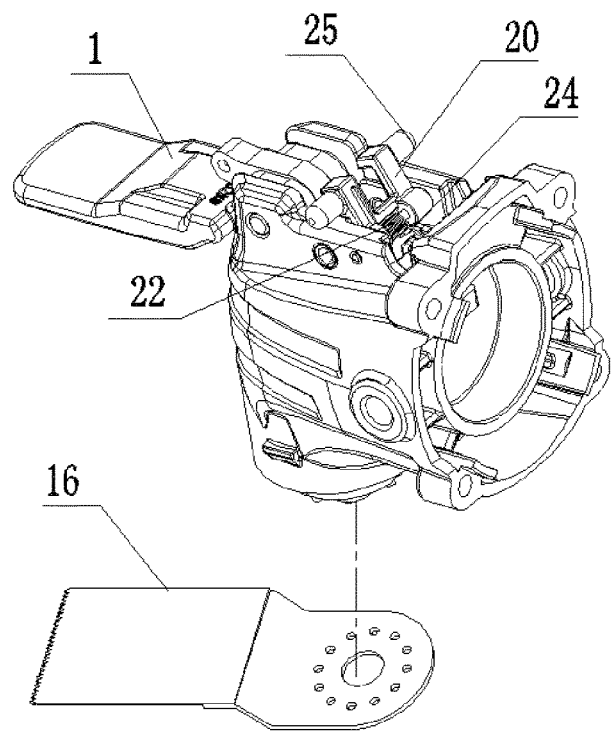
FIG. 10 is a schematic diagram of step 3 of embodiment 2.

The working principle of the return limit mechanism is as follows:

Step 1: with reference to the FIG. 8, the rapid-replacing buckle 1 is moved anticlockwise in the arrow direction, the limit block 20 rotates along with the rapid-replacing buckle under the effect of the torsion spring 22, one end of the limit block 20 far away from the straight pin protrudes upwards until the reset handle 25 is clamped on two sides of the limit slot 24, and at this moment, one end of the limit block 20 far away from the straight pin 21 is higher than the top of the head housing. The structure is shown in the FIG. 9.

Step 2: at this moment, the limit block 20 stops moving due to limitation from the top of the head housing 5, and the rapid-replacing buckle 1 is still subject to anticlockwise moving until it rotates to be parallel with the top surface of the head housing overall. Then, the spring collet located at the bottom of the tool rest protrudes, and the diameter of the spring collet is reduced to the extent that the blade 16 can be installed on the spring collet, forming the structure shown in the FIG. 10.

Step 3: at this moment, the blade 16 is arranged on the tool rest 12, and after the magnetic steel 23 on the tool rest 12 attracts the blade 16, the user can withdraw his hands holding the blade, and then the blade 16 is attracted to the lower surface of a tool.

Figure 11:
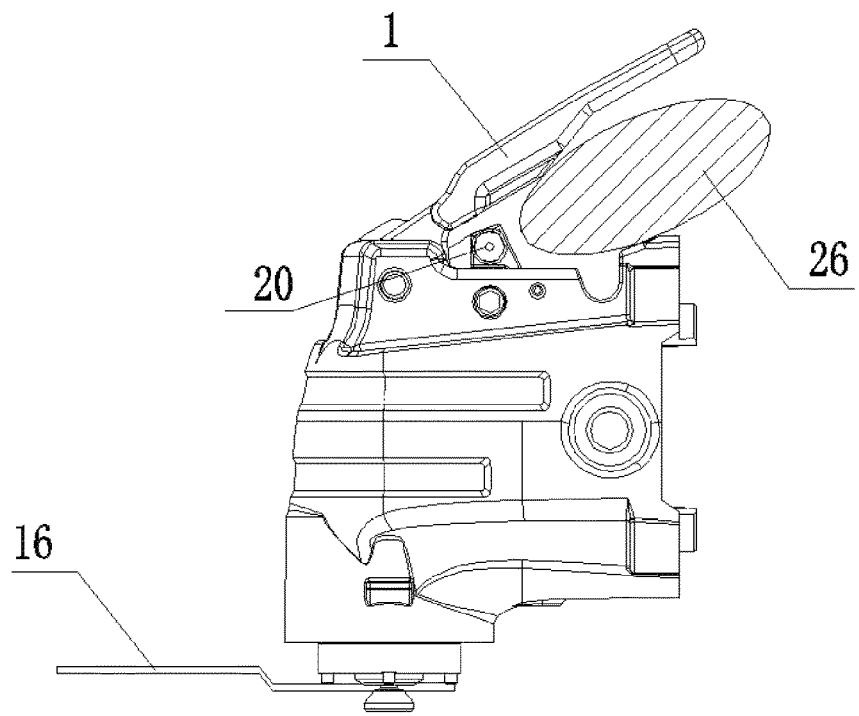
FIG. 11 is a schematic diagram of step 4 of embodiment 2.

Step 4: with reference to the FIG. 11, in the process of fastening the blade, the rapid-replacing buckle 1 is moved clockwise in the arrow direction. When rotating to the position where the limit block 20 is located, the rapid-replacing buckle 1 stops rotating under the limitation effect of the limit block 20, and a protection zone 26 is formed in the position between the rapid-replacing buckle 1 and the top of the head housing 5. The position of the protection zone 26 is where the hand holds the multifunctional saw during operation, so the protection zone 26 has the effect of protecting the personal safety.

Figure 12:
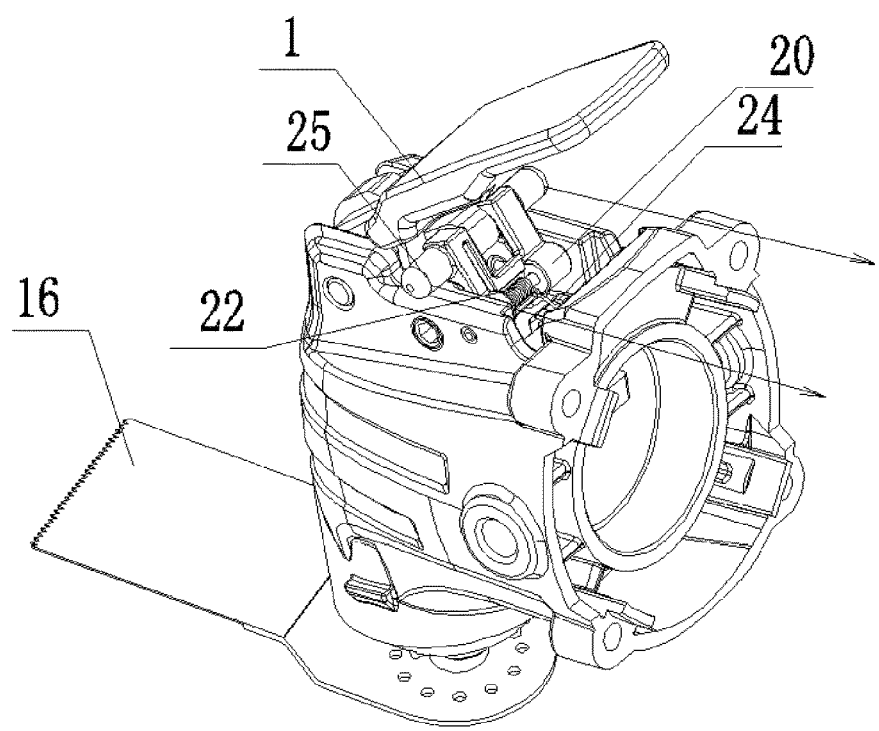
FIG. 12 is a schematic diagram of step 5 of embodiment 2.
Figure 13:
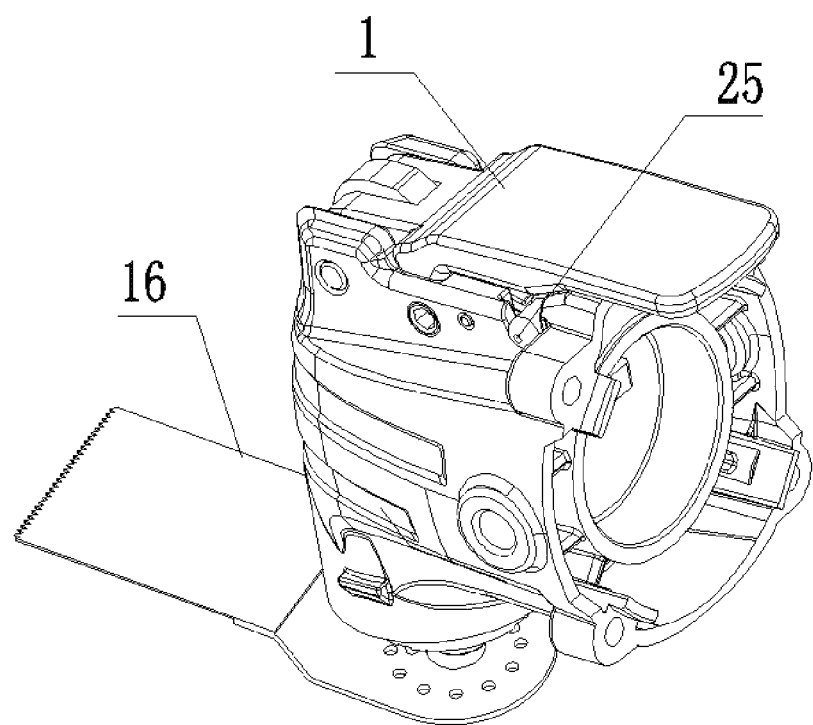
FIG. 13 is a schematic diagram of the rapid-replacing structure of multifunctional saw with assembled blades according to embodiment 2.

Step 5: with reference to the FIG. 12, the reset handle 25 is pulled in the arrow direction to compress the torsion spring 22, so the limit block can return to the original position. At this moment, the rest handle 25 is right located in the handle placing slot; meanwhile the rapid-replacing buckle 1 is pressed downwards so that it can return to the original state, then the rapid-replacing buckle 1 is fastened (generally a snap joint structure is arranged so that the rapid-replacing buckle and the head housing 5 can be fastened tightly), the spring collet returns to the original position, with the diameter enlarging, and the blade 16 will be fastened totally.

The present invention and its implementation mode are schematically described, but the description is not to limit the present invention. The accompanying figures show only one of embodiments of the present invention, and the real structure is not limited to the embodiments. Thus, those skilled in the art should be enlightened that under the premise of not departing from the spirit of the present invention, similar structures and embodiments of the technical scheme with no creative design belong to the protection scope of the present invention.

The invention claimed is:

1. A rapid-replacing structure of multifunctional saw comprising a head housing, a tool rest and an output device, wherein the output device comprises an output shaft; the rapid-replacing structure is characterized by further comprising a rapid-replacing device, which comprises a rapid-replacing buckle, an eccentric block, a movable rod, a spring collet, a tensioning rod and a compression spring; the rapid-replacing buckle and the eccentric block are connected with a top of the head housing through a straight pin; the movable rod is arranged in the output shaft, with a top end of the movable rod closely connected to the eccentric block and a bottom end of the movable rod connected to the tensioning rod by screw thread; an outer side of the tensioning rod is provided with the spring collet, and an outer side of the spring collet is provided with the compression spring; a top end of the compression spring is in close connection with a lower surface of the movable rod, and a bottom end of the compression spring is in close connection with an upper surface of the tool rest; the tool rest is arranged at a bottom of the output shaft; a slope shrinking inwards from top to bottom is arranged on an inner wall of the tool rest; and a bump corresponding to the slope is arranged on an outer surface of the spring collet; a certain space is provided between a top end of the spring collet and the lower surface of the movable rod; a bottom end of the tensioning rod is provided with a tensioning head.

2. The rapid-replacing structure of multifunctional saw according to claim 1, characterized in that the output device is arranged in the head housing, comprising a shifting fork, an output shaft, a deep groove ball bearing and a needle bearing; the deep groove ball bearing is fixed on an outer side of the top of output shaft through snap springs, and the shifting fork is arranged on an outer side of the middle portion of the output shaft; the needle bearing is arranged on an outer side of the bottom of the output shaft.

3. The rapid-replacing structure of multifunctional saw according to claim 2, characterized in that the output shaft is of a hollow cylinder structure divided into upper, middle and lower sections; a diameter of the upper section is smaller than that of the middle section, and the middle diameter is smaller than that of the lower section; an outer wall of the upper section of the output shaft is provided with a mounting slot of the snap springs.

4. The rapid-replacing structure of multifunctional saw according to claim 2, characterized in that the snap springs are arranged at an upper end and a lower end of the deep groove ball bearing respectively; the deep groove ball bearing is connected with the output shaft through the snap spring at the upper end of the output shaft, and with the head housing through the snap spring at the lower end of the output shaft.

5. The rapid-replacing structure of multifunctional saw according to claim 2, characterized in that a seal ring is arranged in the gap between the head housing on the lower side of the needle bearing and the output shaft.

6. The rapid-replacing structure of multifunctional saw according to claim 1, further comprises a return limit mechanism that comprises a limit block, a straight pin and a torsion spring; the rapid-replacing buckle is hinged to a top side of the head housing; an upper portion of the head housing is provided with a limit slot, and the whole rapid-replacing buckle is positioned above the limit slot; the limit block is hinged in the limit slot through the straight pin, and the torsion spring is sheathed on the outer ring of the straight pin; one end of the torsion spring acts on the limit slot, and its other end acts on the limit block; a reset handle is arranged at one end of the limit block far away from the straight pin.

7. The rapid-replacing structure of multifunctional saw according to claim 6, characterized in that 3-5 pieces of magnetic steel are arranged at a bottom of the tool rest; the magnetic steel is uniformly distributed on a bottom surface of the tool rest in the circumferential direction with an axis of the tool rest as the center.

8. The rapid-replacing structure of multifunctional saw according to claim 6, characterized in that the limit block and the reset handle are of an integrated structure, and a handle-placing slot corresponding to the reset handle is arranged on the limit slot.

9. The rapid-replacing structure of multifunctional saw according to claim 6, characterized in that two mounting holes of the straight pin corresponding to each other are arranged in one end where the limit block is connected with the straight pin and on two sides of the limit slot respectively.

* * * * *